April 8, 1941.  C. W. SHIPLEY  2,237,891
RAILROAD SPREADER
Filed Oct. 7, 1939  5 Sheets-Sheet 1
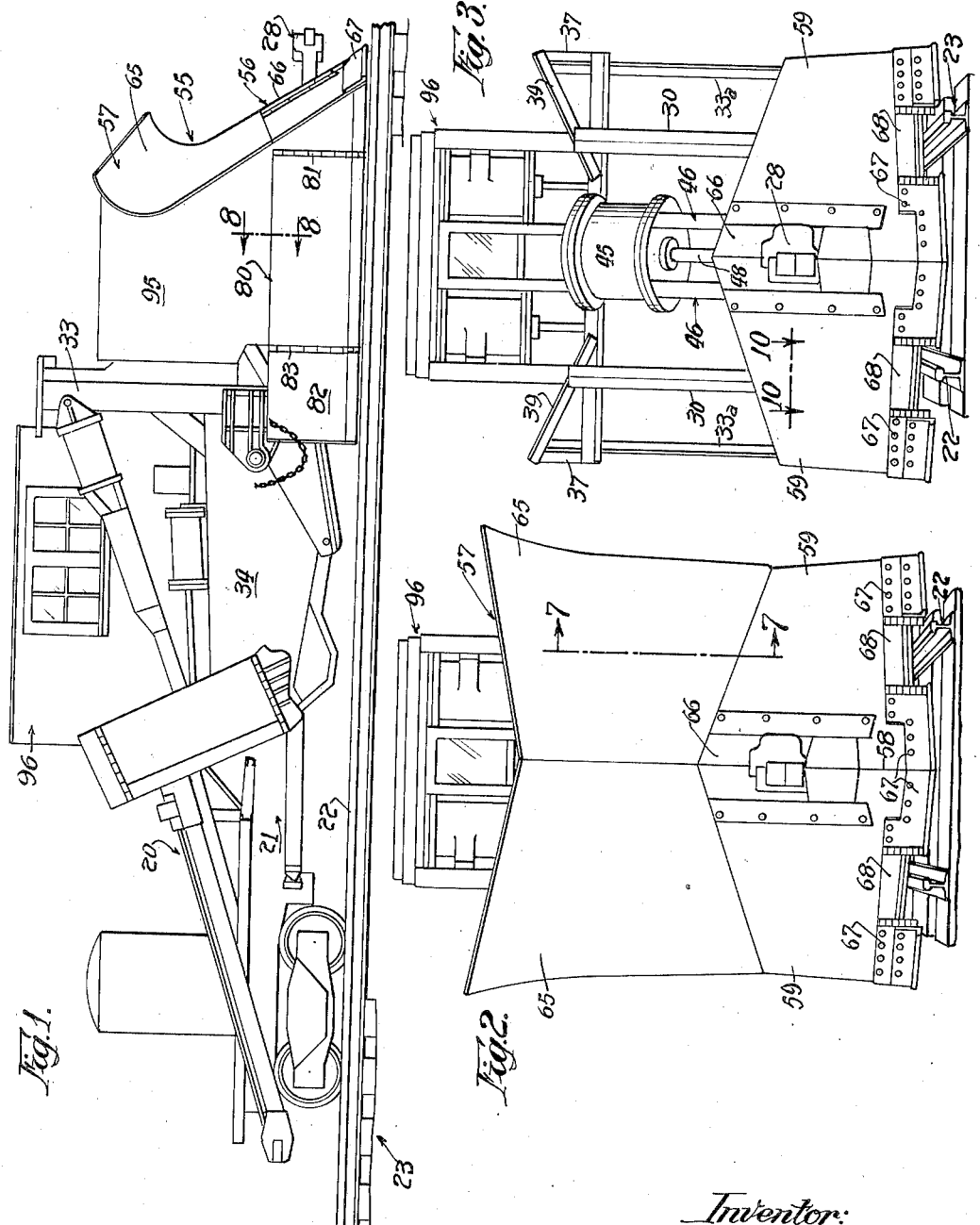
Inventor:
Calvin W. Shipley,
By: Arthur W. Nelson
Attorney.

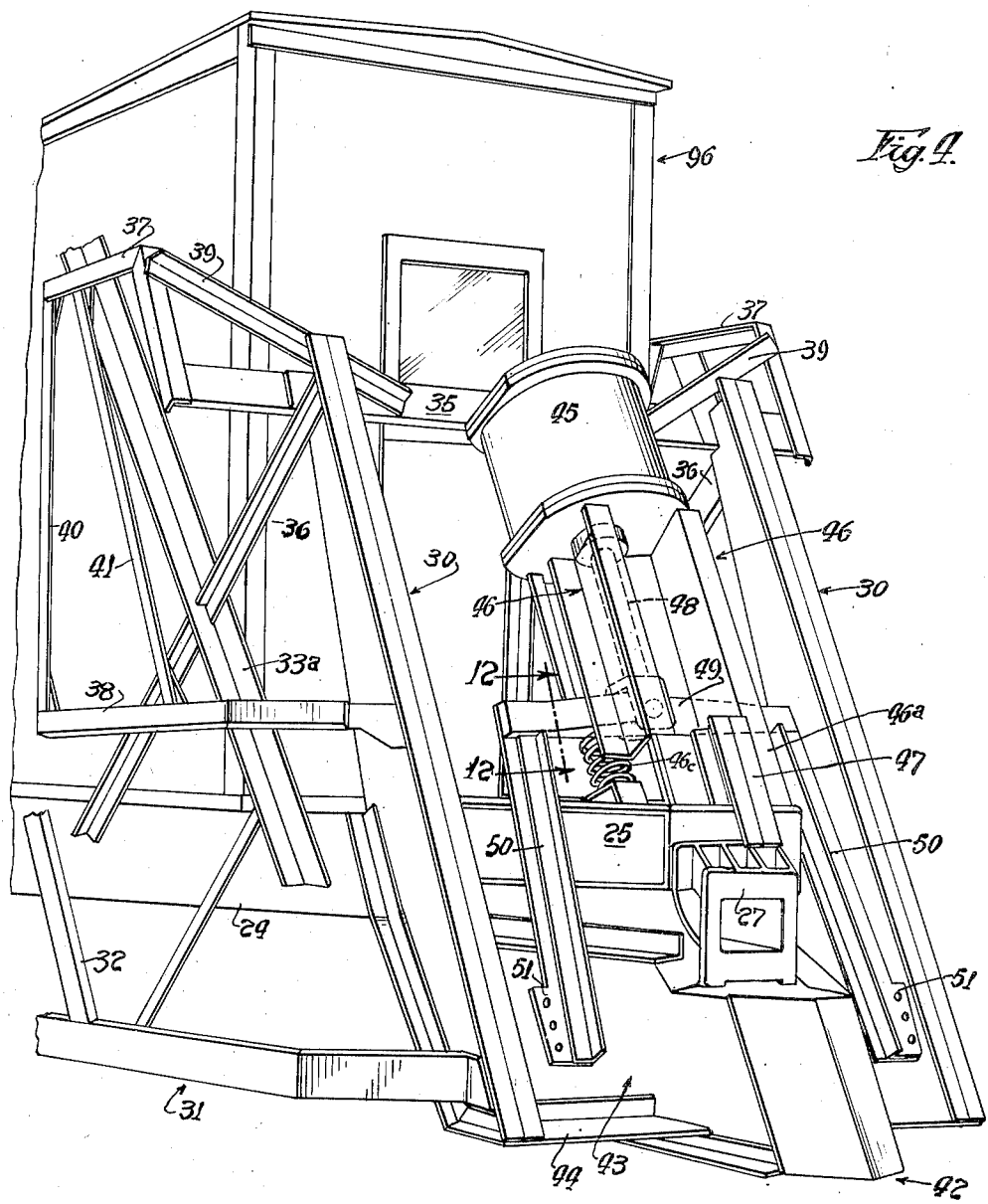

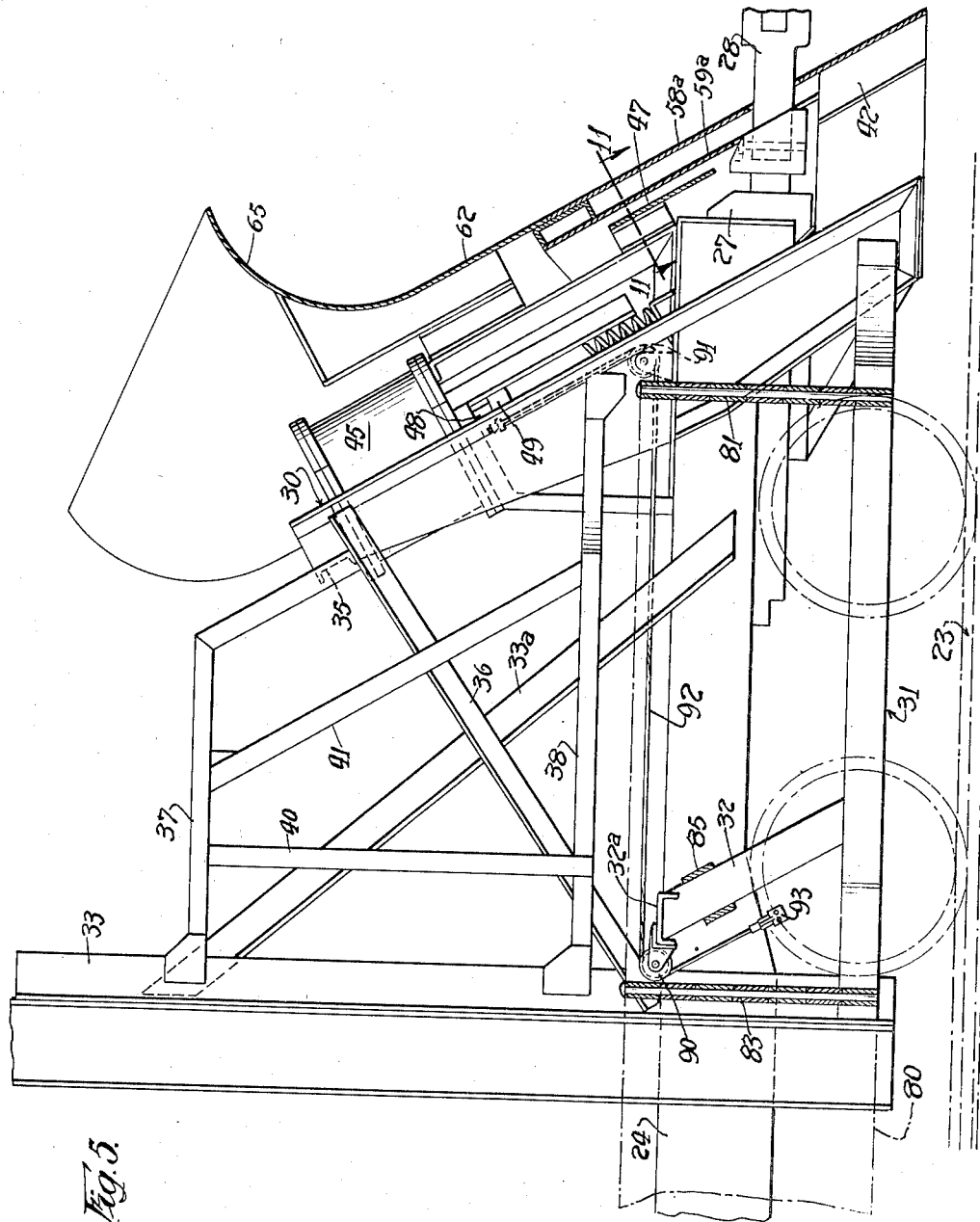

April 8, 1941. C. W. SHIPLEY 2,237,891
RAILROAD SPREADER
Filed Oct. 7, 1939 5 Sheets-Sheet 4
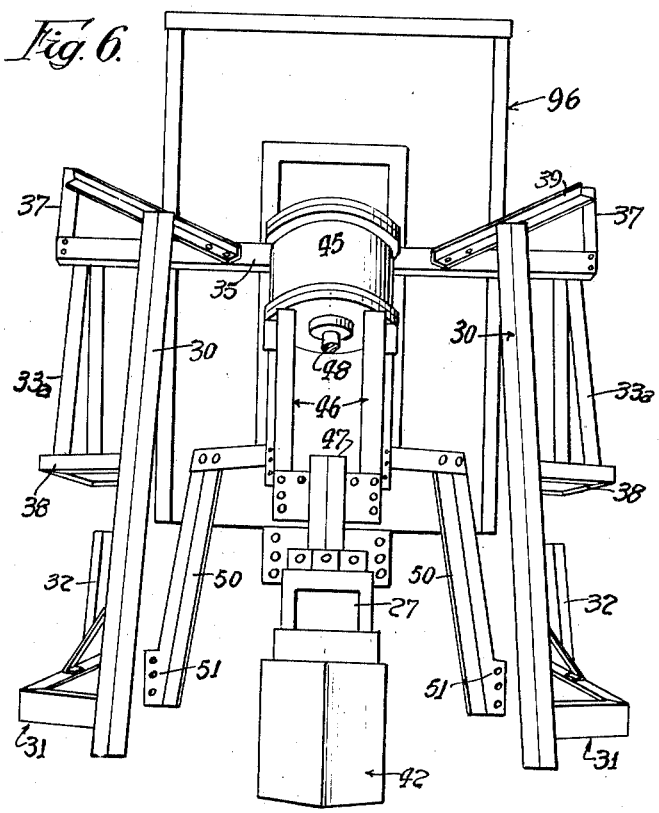
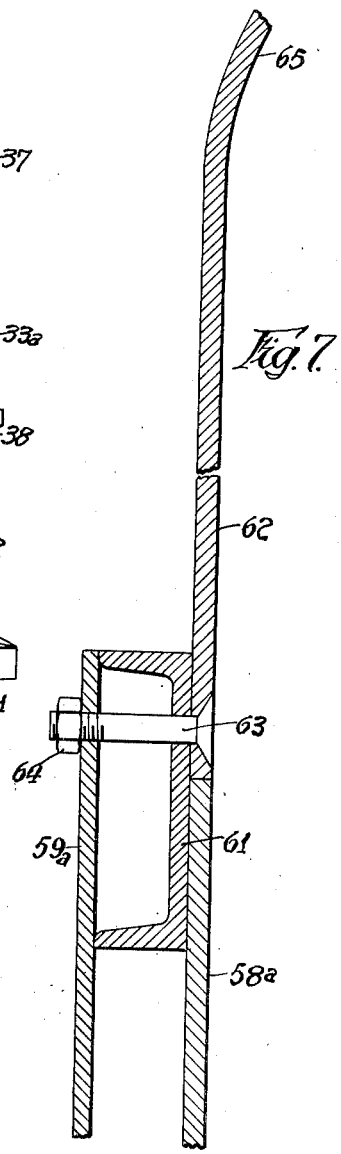
Inventor:
Calvin W. Shipley,
By: Arthur W. Nelson
Attorney.

April 8, 1941.  C. W. SHIPLEY  2,237,891
RAILROAD SPREADER
Filed Oct. 7, 1939  5 Sheets-Sheet 5
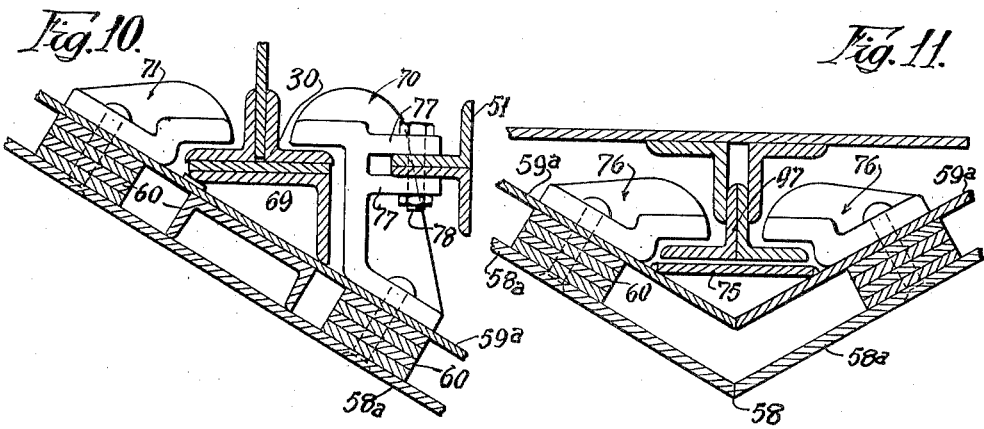
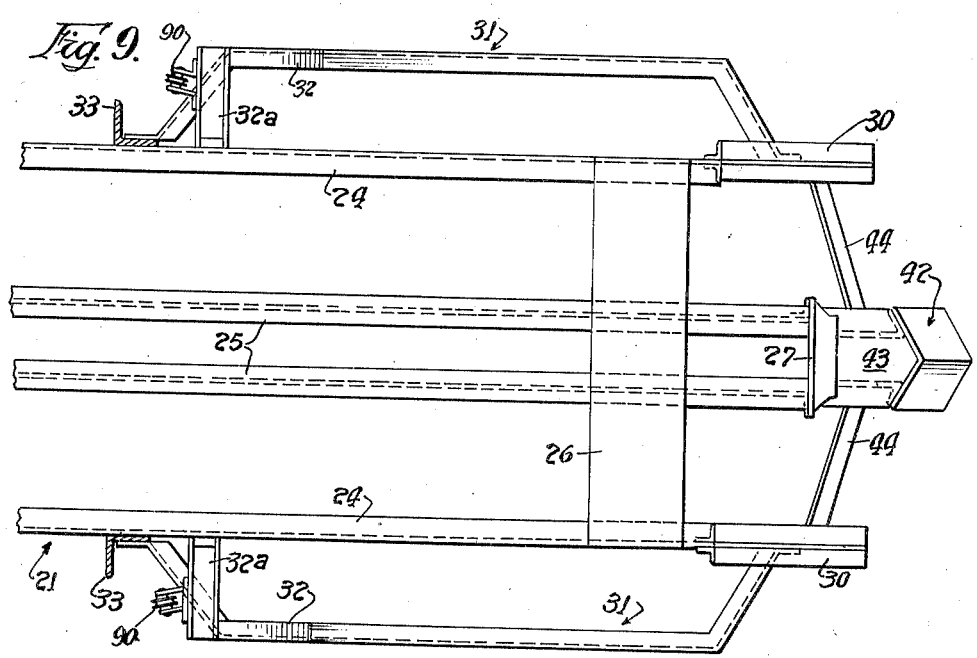
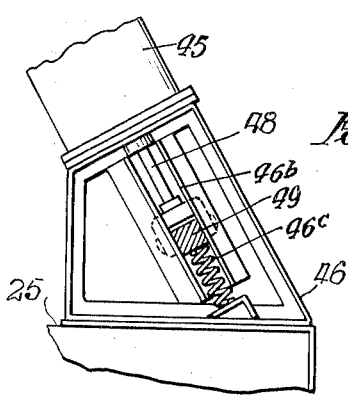
Inventor:
Calvin W. Shipley,
By: Arthur W. Nelson
Attorney.

Patented Apr. 8, 1941

2,237,891

UNITED STATES PATENT OFFICE 2,237,891

RAILROAD SPREADER

Calvin W. Shipley, Hammond, Ind., assignor to O. F. Jordan Company, East Chicago, Ind., a corporation of Indiana Application October 7, 1939, Serial No. 298,385

13 Claims. (Cl. 37—30)

This invention relates to improvements in railroad spreaders and it consists of the matters hereinafter described and more particularly pointed out in the appended claims.

The present invention is more especially concerned with the front plow of the spreader and one of the objects thereof is to provide a plow that is easier to enter into hard or packed material such as frozen snow or ice and packed earth and stone and has a scooping or lifting effect on the material operated upon, when the plow is in motion, so that said material slides upwardly and laterally, thus requiring less motive power to keep the plow in motion and therefore, being more economical in operation.

Another object of the invention is to provide a plow construction for a railroad spreader which may be readily changed in height from a relatively low one for spreading ballast to a relatively high one for plowing deep snow, and which in either form or instance may be more quickly raised from its working position, for clearing a road crossing or switch, and may be quickly returned to said working position after passing said crossing, switch or other obstruction.

Another object of the invention is to provide a front plow of the kind of such construction that the resistance offered by the material plowed, functions to assist in lifting or raising the plow when such lifting or raising is desired in clearing a crossing switch, or other obstruction.

The above mentioned objects of the invention, as well as others, together with the several advantages thereof will more fully appear as the specification proceeds.

In the drawings:

Fig. 1 is a view, in side elevation, of a railroad spreader embodying the preferred form of the invention and shows the plow thereof arranged for plowing deep snow-drifts but in its raised position for passing road crossings or the like.

Fig. 2 is a view in front elevation of the spreader with its plow in its lowered position for removing snow covered ice from the track at an elevation below that of the top of the rails.

Fig. 3 is a view similar to Fig. 2 with the upper section of the plow removed from the lower one as when the spreader is to be used for spreading ballast material.

Fig. 4 is a fragmentary perspective view, on an enlarged scale, of the structural frame-work at the front end of the spreader for supporting the upwardly and rearwardly sloping guides for the plow of the spreader.

Fig. 5 is a view in side elevation of parts of the structural frame-work appearing in Fig. 4 with portions of the plow arranged thereon.

Fig. 6 is a front view of the structural framework appearing in Fig. 4.

Fig. 7 is a detail vertical sectional view, on an enlarged scale, through a part of the plow as taken on the line 7—7 of Fig. 2.

Fig. 8 is a detail vertical sectional view on the scale of Fig. 7 through one side of the plow, as taken on the line 8—8 of Fig. 1.

Fig. 9 is a top plan view of the underframing at the plow end of the car along with certain structural members upon which the plow is operatively engaged as will be more fully referred to later.

Fig. 10 is a detail horizontal sectional view through a part of the plow and one of its associated side slides as taken on the line 10—10 of Fig. 3.

Fig. 11 is another detail horizontal sectional view through a part of the plow and its associated front or center slide as taken on the line 11—11 of Fig. 5.

Fig. 12 is a detail vertical sectional view through a part of the plow structure as taken on the line 12—12 of Fig. 4 and illustrates more particularly the cushion arrangement for the transverse lift bar of the plow.

Referring now in detail to that embodiment of the invention illustrated in the drawings: 20 indicates, as a whole, the car of a railroad spreader that includes an underframe 21 mounted on front and rear wheeled trucks for travel upon the rails 22 of a railway track 23. The underframe includes side sills 24, a center sill 25 and a cross member 26 at the plow end of the frame that functions as an end sill. The front end of the center sill projects beyond the front end of the side sills and supports a coupler pocket striking casting 27 and a coupler 28 which appears in Fig. 1.

At the plow end of the underframe is provided a pair of laterally spaced, upwardly and rearwardly sloping or inclined side slides or guides 30 for a plow, as will later appear. These slides or guides which are built up beams, are each engaged with and operatively secured at points between its ends to the end of a side sill 24 in a suitable manner.

The bottom ends of said slides are braced by lower sub-frames 31 arranged in a plane below and spaced outwardly from the plane of the side sills. The front end of each sub-frame is secured to the bottom end portion of a side slide or guide 30. The intermediate portion of each sub-frame is braced by an upwardly and rearwardly extending strut 32, from a lateral arm 32ª on the associated side sill and the rear end of each sub-frame is operatively connected to the bottom end portions of an associated upright guide post 33 at the same side of the car. The main side wings 34 of the spreader and their associated braces, whereby the main wing may be raised or lowered into and out of operative position with respect to the track, are operatively connected to said guide posts. Of course, the main wing carries the usual extension wing and means are provided for swinging the wing inwardly and outwardly into the desired spreading position. However, as the mechanism for this purpose forms no part of the present invention it is neither illustrated or described in detail herein.

The upper end of the main slides or guides 30 are attached to a cross member 35 and are connected to the side sills 24 by downwardly and rearwardly extending braces 36. The extremities of the cross member 35 are operatively secured to parts of an upper sub-frame that include top and bottom longitudinally disposed bars 37 and 38 and these bars are disposed in the vertical planes of the major portions of the lower sub-frame 31. The front end of each bottom bar 38 is bent inwardly and is secured to the associated guides 30 while the rear end of each bar 38 is extended inwardly so as to be attached to the post 33 on the same side of the car. The front end of each upper bar 37 is attached to a brace extension 39 for the associated end of the cross member 35, while the rear end of each bar 37 is bent inwardly for attachment to the upper portion of the main post 33 on the same side of the car. The top and bottom bars 37 and 38 of each upper sub-frame are connected by vertical and inclined bars 40 and 41. The brace 36 for the upper end of each slide 30 is connected at a point between its ends by an inclined brace 33a that extends from each post 33 down to the side sill 24 on the same side of the car.

42 indicates a thrust receiving member or bulldozer nose, as it is sometimes called, and which is located below and extends forwardly from the coupler pocket 27. This nose which is of a V-shaped cross section at the front end is supported by suitable frame-work 43 from the front end of the center sills 25 and the sides of the front end thereof are connected to the bottom ends of the slides 30 by structural members 44. This nose which is located at the front bottom end of the front plow structure, as a whole, is exceptionally strong and rigid and bears the brunt of the pressure imposed upon the associated plow, later to be described, in plowing low down for ice breaking purpose between and outside the rails. As this nose is stationary, its bottom edge is disposed at an elevation above that of the tread surfaces of the rails so as to clear road crossings, switches and the like.

Located between the upper ends of the main slides 30 and right in line with the median line of the car as a whole, is a pressure fluid actuated cylinder 45, the axis of which is disposed in the same slope as that of the main slide guides 30. This cylinder is supported by a pedestal that includes laterally spaced frames 46—46 engaged upon and operatively secured to front end portions of the spaced beams of the center sill 25. The front bottom ends of both pedestal frames are connected together by a plate 46ª and the mid portion of this plate supports a center guide or slide 47 that is disposed at the same slope or angle of inclination as the main slides 30 but forwardly of the same. Within the cylinder is located a piston (not shown) to which is connected the upper end of a piston rod 48 and the bottom end of said rod is operatively connected to the center portion of a cross bar 49 that extends through a long slot 46ᵇ in and laterally beyond each open frame 46 of the pedestal. A spring 46ᶜ is disposed in the bottom end of each slot 46ᵇ below the cross bar 49 and the bottom end of said spring engages on a seat provided therefor on the associated side of the pedestal. When pressure fluid is admitted to the top end of the cylinder to force the bar 49 downwardly, then the springs 46ᶜ are compressed to cushion the same. When pressure fluid is admitted to the bottom end of the cylinder to force the bar upwardly, the springs 46ᶜ expand and give an impetus or quick start to the upward movement of the bar 49. The top end of a pair of lifting bars 50 is fixed one to each end of the cross bar 49 and the bottom end of each bar 50 is provided with an apertured lateral extension 51 that is fixed to the plow of the car as will later appear.

55 indicates the plow as a whole and which is of an upwardly and rearwardly sloping V-shape. It includes a lower section 56 and an upper section 57 detachably secured thereto and whereby the upper section may be removed from the lower one when the car is to be used for spreading ballast only. The lower section which is of a box-type welded construction includes a center ridge 58 and sides 59—59 that extend rearwardly and outwardly and have an upward and rearward slope that corresponds to the slope of the guides 30—30.

Said lower section includes front and rear plates 58a and 59a secured to substantially vertical and horizontal spacing bars 60 and 61 appearing in Figs. 10 and 7 respectively. The spacing bar 61, which is in the form of a channel, and the rear plate 59a project above the top edge of the front plate 58a as appears in Fig. 7. The upper section 57 of the plow includes a single plate 62 (see Fig. 7), the bottom margin of which engages against the exposed part of the upper spacing bar 61, and the lower edge of said single plate abuts flush against the top edge of the front plates 58a of the lower plow section. Bolts 63 pass through the bottom margin of the front plate and through the spacer bar 61 and top margin of the rear plate of the lower plow section, after which nuts 64 are secured to the bolts from the rear of the plow to detachably secure the upper plow section to the lower one. The upper margin of the plates of the upper plow sections flares or bends forwardly as at 65 to impart a curling over action as snow climbs the working face of the plow in the operation thereof.

In the ridge portion of the lower plow section is provided an opening through which the shank of the coupler extends. A cover plate 66 is associated with the ridge portion of the lower plow section so as to keep said opening closed at all times when the plow is raised and lowered. The cover plate mechanism forms no essential part of the present invention and therefore it is neither illustrated nor described in detail herein.

The lower plow section is provided at its bottom margin on the front side of the plow with cutting shoes 67 and parts thereof in the planes of the rails of the railroad track are cut away to accommodate the rails when the plow, as a whole is in its lowermost working position. Under certain instances, the recesses may be shortened in vertical depth by the use of filler plates 68 which may be adjustably fixed to the shoes 67.

On the rear face of the rear plate 59a of the lower plow section, I provide a bearing bar 69 that slidingly engages upon the front face of each main slide 30. Also I provide on the rear face of the rear plate 59a, guide clamps 70 and 71, one on the inside and one on the outside of the main slides 30. These clamps operate to hold the bearing members 69 in operative engagement upon the main slides 30. The clamping members 70 and 71 do not have a tight fit with the guides but the fit is such as to provide some tolerances in the movement of the plow on the main guides, both laterally and longitudinally of the car, so that the plow may adjust itself to unequal movements of both sides of the plow without binding on the guides.

On the upper rear sides of the ridge portion of the lower plow section, I provide a bearing member 75 that has sliding bearing upon the center slide or guide 47 previously described as supported from the laterally spaced side frames 46 of the cylinder supporting pedestal. Associated with the bearing member 75 are guide clamps 76 also secured to the rear side of the plow, one at each side of the bearing member 75. These guides are disposed to permit a limited amount of play of the plow relative to the center guide 47.

The inner guides 70—71, each carries a pair of spaced ears 77—77 (see Fig. 10) and each pair of ears receives between them one associated ear member 51 on the actuating bars 50, bolts 78 passing therethrough to operatively connect them together.

The rear face of the bottom ridge portion of the lower plow section substantially engages with a sliding bearing upon the thrust receiving member 42 which as before described is supported from and transmits the thrust imposed, directly to the center sill of the underframing.

The lower section of each side of the plow has associated therewith a side wing 80 also of a box-type construction (see Fig. 1). Each side wing is hinged at its front to the vertical rear outer end of the associated side of the lower plow as at 81 and the rear end of each wing terminates substantially at the post 33 on the same side of the car. This last mentioned end of the wing has an auxiliary wing 82 hinged thereto as at 83. Normally the side wings stand in a vertical plane so as to engage the top and bottom members 37—38 and the sub-frame 31 at the same side of the car. On the inner face of the rear end of each wing 80 I provide a bracket 85 (see Fig. 5) that has sliding bearing engagement upon the member 32 associated with each sub-frame 31 before described, On the rear portion of the member 32a of each side sill 24 I mount a sheave 90 and on each beam of the center sill I mount a second sheave 91 outside of the pedestal and substantially in line with an associated sheave 90, considered longitudinally of the car. The mid-portion of a cable 92 is trained over the pulley 90 and under the pulley 91 and the rear end of each cable passes downward from the pulley 90 to be anchored at its extremity to a bracket 93 (see Fig. 5) that is fixed to the inner face of the rear end of the associated side wing 80. The front end of each cable after it leaves the pulley 91 is extended upwardly and is anchored at its extremity to an associated end of the cross bar 49 connected to the piston rod 48 of the cylinder 45. The cables 92 support the rear end of the respective side wings 80 and as they are connected to the cross bar 49 as before mentioned, they function to raise and lower the rear ends of the side wings simultaneously with the raising and lowering of the plow, as a whole.

The upper plow section is provided with a side apron 95 at each side of the car and each apron is detachably secured at its bottom end to a side wing 80, see Fig. 8, in substantially the same manner that the plates 62 of the upper plow section are secured to the lower plow section.

The cylinder 45 is a hydraulic one and is controlled from within the cab 96 on the car located just to the rear of the main side posts 33.

In the operation of the plow, assume that the car, as a whole, is in transport to a place of use for plowing snow. At this time, hydraulic fluid will have been admitted into the bottom of the cylinder 45 to raise the piston therein. The piston through its rod 48 and connections to the lower plow section 56 and the side wings 80 will have raised the plow and side wings into a position wherein the shoes 67 on the bottom margin of the lower plow section 56 are above the top of the rails so that the plow as a whole may clear crossings and switches in the track.

When the place of operation is reached, fluid under pressure is admitted to the top end of the cylinder 45 and this through its rod 48 and connection to the plow and side wings before mentioned, lowers the plow into working position and wherein the shoes 67 are only a short distance above the ties of the track and the filler plates 68 are only a short distance above the top of the rails 22.

As the car is pushed into a deep snow drift, with its shoe cutting edge extending forward or in advance of the body of the plow, said edge is entered into the packed snow and ice immediately. As the car proceeds forwardly, the plow because of its sloping V-shape exerts a scooping and lifting effect upon the material operated upon. The stream of material operated upon is divided by the ridge of the plow so that the two divided streams thereof slide upwardly and laterally outward along each side of the plow. When plowing in snow, deeper than the vertical height of the lower plow section, the snow climbs upwardly and outwardly of the upper plow section and by reason of the flare, such material as reaches the top of the plow is caused to curl over as a roll for an easy sliding off from the upper side portion of the upper section of the plow.

The material thus plowed, as it leaves the top flared portion of the plow, is discharged or slides off the ends of the flared parts 65 of the upper plow section to be deposited on top of the sides of the banks cut or formed in the material.

When known crossings, switches or other obstructions are being approached and it is necessary to raise the plow to clear the same, the cylinder 45 is caused to raise the plow the desired amount as before explained. This action of the cylinder in raising the plow is assisted by the pressure or load that the material being plowed imposes upon the plow. Thus it is much easier to raise a sloping lift plow of this kind along the inclined guiding structure than the vertical lift plow heretofore used because the pressure applied against the plow assists in raising the same instead of hindering or opposing such raising as in a vertical lift snow-plow.

It is apparent that the heaviest pressure imposed upon the plow in a plowing operation is upon the central bottom portion thereof. In the present construction this pressure is exerted as a thrust against the member or nose 42 which amply resists the same by reason of its connection with the underframe as before described.

Under ordinary plowing conditions, the weight of the plow is sufficient to hold itself in its lowered operating position. However, when frozen or hard packed material is being operated upon, the plow may be held down in its lowered position by manipulation of the controls in the cab 96, for the cylinder 45.

For ballast spreading work, the upper plow section may be readily removed from the lower plow section as is apparent.

While in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. In combination with a car adapted for travel upon the rails of a railway track and including an underframe, an upwardly and rearwardly sloping plow at one end of said car, said plow being of a V-shaped type to include a center ridge and sides diverging outwardly and rearwardly therefrom, means carried by said end of the car providing an upwardly and rearwardly sloping guide structure and with which said plow is operatively engaged, said means including a member supported by but in advance of and below said underframe and engaged by the bottom central portion of said ridge and said sides of the plow for taking the thrust imposed thereon during a plowing operation, and means for moving said plow longitudinally of said guide structure into and out of operative position with respect to said railway track.

2. In combination with a car adapted for travel upon the rails of a railway track, an upwardly and rearwardly sloping plow of a V-shaped type comprising upper and lower sections and the upper section of which is removable from the lower section, means carried by said end of the car providing an upwardly and rearwardly sloping guide structure and with which both sections of the plow are operatively engaged, and means connected to one of said sections of the plow for moving both sections of the plow longitudinally of said guide structure to position the bottom section of the plow in or out of operative position with respect to the track.

3. In combination with a car adapted for travel upon the rails of a railway track, an upwardly and rearwardly sloping plow at one end of the car, said plow being of a V-shaped type to include a center ridge and sides diverging outwardly and rearwardly therefrom, means carried by said end of the car providing an upwardly and rearwardly sloping guide structure and with which said plow is operatively engaged, means for moving said plow longitudinally of said guide structure into and out of operative position with respect to the railway track, and means also carried by said end of the car and engaged by the bottom central portion of said ridge and said sides of the plow for taking the thrust imposed upon the plow during a plowing operation.

4. In combination with a car adapted to travel upon the rails of a railway track, and including an underframe, an upwardly and rearwardly sloping plow at one end of the car, a framing at said end of the car and including structural members, parts of which extend above and below said underframe, means on certain of said members providing upwardly and rearwardly sloping guides with which said plow is operatively engaged, and means for moving said plow longitudinally of said guides into and out of operative position with respect to the track, said last mentioned means including a power cylinder disposed to the rear of the plow and located between and substantially parallel with those parts of said guides above said underframe and a piston rod associated with said cylinder and connected to a portion of the plow.

5. In combination with a car adapted for travel upon the rails of a railway track and including an underframe, an upwardly and rearwardly sloping plow at one end of the car, a framing at said end of the car and including structural members, parts of which members extend above and below said underframe, means on certain of said members providing upwardly and rearwardly sloping guides with which said plow is operatively engaged, means for moving said plow longitudinally of said guides, and a member supported by and in advance of and below the underframe and slidably engaged by the bottom central portion of the plow for taking the longitudinal thrust imposed upon the plow during a plowing operation, and which member is laterally braced from those parts of said structural members below the underframe.

6. In combination with a car adapted for travel upon the rails of a railway track, an upwardly and rearwardly sloping plow at one end of said car, means carried by said end of the car providing an upwardly and rearwardly sloping guide structure and with which said plow is operatively engaged, side wings each operatively connected at one end to the plow, means providing upwardly and rearwardly sloping secondary guide structures on said end of the car and with which the other end of said wings are operatively engaged, power actuated raising and lowering means on said end of the car, and means for connecting said plow and the other end of both wings to said power actuated raising and lowering means for simultaneously moving said plow and both of said wings longitudinally of said structures into and out of operative position with respect to the railway track.

7. In combination with a car adapted for travel upon the rails of a railway track, and including an underframe, an upwardly and rearwardly sloping plow at one end of the car, a framing at said end of the car and including structural members and parts of which members extend above and below said underframe, means on certain of said members providing upwardly and rearwardly sloping guides with which said plow is operatively engaged, a fluid actuated cylinder and piston supported on said structural members above the underframe with the axis thereof disposed substantially in the same slope as that of said guides, and means for connecting said piston to said plow for moving the plow longitudinally of the guide into and out of operative position with respect to the track.

8. In combination with a car adapted for travel upon the rails of a railway track and including an underframe, an upwardly and rearwardly sloping plow at one end of the car, a frame at said end of the car and including laterally spaced, upwardly and rearwardly sloping members extending above and below said underfame, and with which members said plow is engaged for a sliding guided movement, power means arranged between said laterally spaced members and including a member adapted for movement in the plane of said upwardly and rearwardly sloping members, a lifting bar connected to the said member of the power means and extending laterally therefrom, and means operatively connecting laterally spaced points of the plow toward the bottom thereof, with said lifting bar.

9. In combination with a car adapted for travel upon the rails of a railway track and including an underframe, an upwardly and rearwardly sloping plow at one end of the car, a frame at said end of the car and including laterally spaced, upwardly and rearwardly sloping members extending above and below said underframe, and with which members said plow is engaged for a sliding guided movement, power means arranged between said laterally spaced members and including a member adapted for movement in the plane of said laterally spaced members, a lifting bar connected to the said member of the power means and extending laterally therefrom, means operatively connecting laterally spaced points of the plow toward the bottom thereof with said lifting bar, and means carried by and arranged below the underframe at said end of the car and between said laterally spaced member and engaged by a midportion of the plow for taking the thrust imposed upon said portion of the plow during a plowing operation.

10. In combination with a car adapted for travel upon the rails of a railway track and including an underframe, an upwardly and rearwardly sloping plow at one end of said car, said plow being of a V-shaped type to include a center ridge and sides diverging outwardly and rearwardly therefrom, a framing at said end of the car and including laterally spaced, upwardly and rearwardly sloping guide members extending above and below said underframe and with which members the side of the plow have a sliding guided engagement, means supported by the underframe and arranged in advance of and parallel with the said laterally spaced guide members of said framing and with which a portion of the ridge of the plow has sliding guided engagement, and means also supported by the underframe and operatively connected to the plow for raising and lowering the plow in guided engagement on said laterally spaced members and on said guide structure into and out of operative position with respect to the railway track.

11. In combination with a car adapted for travel upon the rails of a railway track and including an underframe, an upwardly and rearwardly sloping plow at one end of said car, said plow being of a V-shaped type tube to include a center ridge and sides diverging outwardly and rearwardly therefrom, a framing at said end of the car and including laterally spaced upwardly and rearwardly sloping guide members extending above and below said underframe and with which members the sides of the plow have a sliding guided engagement, means providing a pedestal on the underframe between said laterally spaced guide members, a guide supported by said pedestal and arranged in advance of and parallel with said laterally spaced members and with which a portion of the ridge of the plow has sliding guided engagement and hydraulic means supported by said pedestal and operatively connected to the plow for moving the plow into and out of operative position with respect to the track.

12. A plow embodying therein upper and lower plow sections, one of said sections including front and rear plates, means for spacing one margin of said plates the desired distance apart and which means extends beyond the margins of one of said plates, the other section including a plate arranged in the plane of said one of said plates and engaging and being fixed to said spacing means.

13. A plow embodying therein upper and lower V-shaped plow sections, the lower section comprising a pair of spaced front and rear plates, the upper edge of the front plate terminating short of the upper edge of the rear plate, a spacing element between the upper portion of the plates of the lower section and having a portion disposed in a plane above that of the top edges of said front plate, the upper section comprising a plate having a portion disposed in the plane of the front plate of the bottom section and engaged against that portion of the spacing element above the top edge of said front plate, and means for detachably securing said portion of said plate of the upper section to said spacing element.

CALVIN W. SHIPLEY.